No. 774,988. PATENTED NOV. 15, 1904.
L. MAURER.
DEVICE FOR KEEPING FLOWERS ON GRAVES ALIVE.
APPLICATION FILED MAY 31, 1904.
NO MODEL.

Witnesses
Max B. A. Doring
Mabel Hamburger

Inventor
Louis Maurer
By Attorney
Max D. Ordmann

No. 774,988. Patented November 15, 1904.

UNITED STATES PATENT OFFICE.

LOUIS MAURER, OF BROOKLYN, NEW YORK.

DEVICE FOR KEEPING FLOWERS ON GRAVES ALIVE.

SPECIFICATION forming part of Letters Patent No. 774,988, dated November 15, 1904.

Application filed May 31, 1904. Serial No. 210,420. (No model.)

*To all whom it may concern:*

Be it known that I, LOUIS MAURER, a citizen of the United States, residing at Brooklyn, in the State of New York, have invented certain new and useful Improvements in Devices for Keeping Flowers on Graves Alive, of which the following is a specification.

The present invention relates to a device for keeping flowers on graves alive.

It has been found that, especially in hot summers, the ordinary watering of the flowers on graves is insufficient to keep the flowers alive and when there is little rain the flowers soon dry out and rot.

The object of my invention is to arrange a device by means of which the earth in which the flowers are planted will be kept sufficiently wet, whereby the flowers will be prevented from drying out.

My device consists of a dish-like receptacle of a size corresponding with that of the grave and adapted to be fitted on the top of the earth covering the corpse in such a manner that the upper edges of the walls of said receptacle will be level with the ground of the graveyard. The said receptacle is at its open top covered with nettings, serving to support the ground forming the mound of the grave. These nettings are so arranged that the same will permit the passage of water from the receptacle to the earth of the mound, which water can be supplied from the outside to the said receptacle, but will prevent the earth from falling into the said receptacle and from gradually filling up the same.

My invention will be more fully understood from the accompanying drawings, in which similar letters denote similar parts, and in which—

Figure 1:
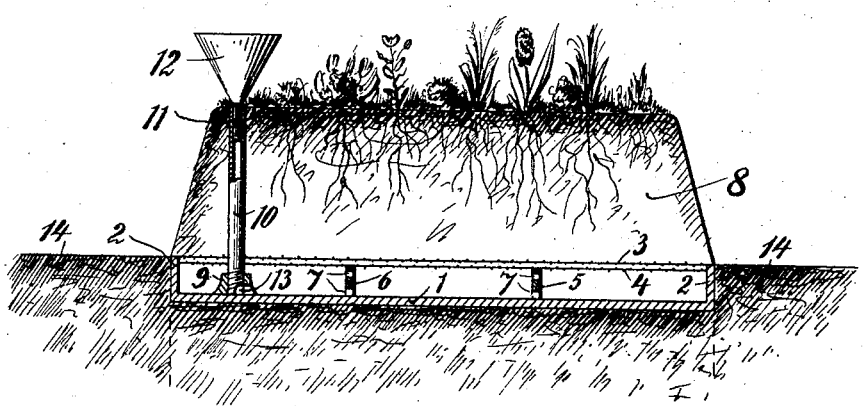
Figure 2:
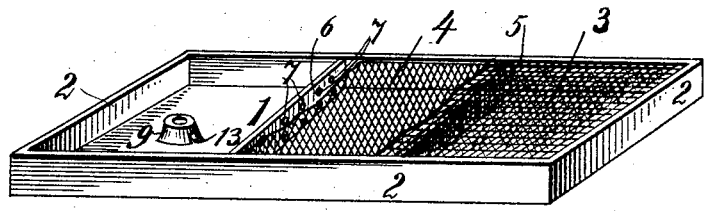

Figure 1 is a sectional elevation of the mound of the grave and of my device applied thereto, and Fig. 2 a perspective view of the device.

Referring to the drawings, numeral 1 indicates a dish-like shallow receptacle, and 2 2 its walls. Said receptacle may be made of any suitable material, preferably of galvanized metal, and may be provided with carriers or partition-walls 5 6, perforated, as at 7, adapted to serve as a support for nettings arranged at the open top of the receptacle. As seen from the drawings, I have arranged two different nettings 3 and 4 one above the other, the lower one having a wider and the upper one a narrower meshing, both being suitably attached to the top of the receptacle and serving to support the earth of the mound 8. From the outside and through the mound 8 a pipe 10 may lead into the receptacle 1 and may be adapted to receive a funnel 12, the lower part 11 of which is adapted to engage the upper end of the pipe 10. At the bottom of the receptacle 1 a nozzle 9 to receive the lower end of the pipe 10 and to hold it in position by screw-thread is arranged. The pipe 10 preferably extends to the very bottom of the receptacle and is provided with a lateral opening, a corresponding opening 13 being arranged in the nozzle 9 to register therewith. The water being supplied to the funnel 12 flows through the pipe 10 and opening 13 into the receptacle 1, in which it accumulates. The pressure of the water contained within the funnel 12 and the pipe 10 and the pressure of the air will cause the water in the receptacle to rise, so that the earth of the mound 8 will suck up the same through the nettings 5 and 6.

A regular supply of water to the funnel 12 in case when there is little rain will keep the earth of the mound 8 always wet and prevent the flowers from becoming dry.

Having thus described the nature of my invention, what I claim, and desire to secure by Letters Patent, is—

1. A device for keeping flowers on graves alive, comprising a shallow dish-like receptacle adapted to be fitted upon the earth covering the corpse, two nettings one above the other and at the open top of the receptacle, cross-pieces or perforated partition-walls adapted to support the said nettings, the lower netting having a wider and the upper one a narrower meshing, the nettings being adapted to support the mound of the grave and means for supplying water to said receptacle, substantially and for the purpose as specified.

2. A device for keeping the flowers on graves alive, comprising a dish-like receptacle adapted to be fitted upon the earth covering the corpse, carriers or partition-walls, two nettings covering the open top of said receptacle and supported by said carriers, the two nettings being arranged one above the other, the lower one having a wider and the upper one a narrower meshing, and both being adapted to support the mound of the grave, a pipe leading from the outside through the said mound to the bottom of the receptacle, and a funnel at the upper end of said pipe for the supply of water, substantially and for the purpose as specified.

In testimony whereof I have signed my name to this specification, in the presence of two subscribing witnesses, this 28th day of May, 1904.

LOUIS MAURER.

Witnesses:
    ANDREW ABEL,
    MABEL HAMBURGER.